United States Patent
Ricketts

(10) Patent No.: US 10,212,888 B2
(45) Date of Patent: Feb. 26, 2019

(54) SIEVE ARRANGEMENT IN A CLEANING SYSTEM FOR A COMBINE HARVESTER

(71) Applicant: CNH Industrial America LLC, New Holland, PA (US)

(72) Inventor: Jonathan E. Ricketts, Coal Valley, IL (US)

(73) Assignee: CNH Industrial America LLC, New Holland, PA (US)

( * ) Notice: Subject to any disclaimer, the term of this patent is extended or adjusted under 35 U.S.C. 154(b) by 40 days.

(21) Appl. No.: 15/427,204

(22) Filed: Feb. 8, 2017

(65) Prior Publication Data

US 2018/0220584 A1 Aug. 9, 2018

(51) Int. Cl.
*A01F 12/44* (2006.01)
*A01D 41/12* (2006.01)

(52) U.S. Cl.
CPC ........ *A01F 12/448* (2013.01); *A01D 41/1243* (2013.01)

(58) Field of Classification Search
CPC . A01D 75/282; A01D 41/1276; A01F 12/448; A01F 12/44; A01F 12/446; B07B 1/4636
USPC ................. 460/13, 6, 5, 4; 209/394, 416
See application file for complete search history.

(56) References Cited

U.S. PATENT DOCUMENTS

| | | | |
|---|---|---|---|
| 2,189,706 A * | 2/1940 | Clipston | A01D 75/282 460/10 |
| 2,500,448 A | 3/1950 | Bozarth | |
| 3,800,803 A * | 4/1974 | Rouse | A01F 12/446 209/398 |
| 4,008,722 A * | 2/1977 | Jakobi | A01F 12/305 460/8 |
| 4,259,829 A * | 4/1981 | Strubbe | A01D 41/1276 460/1 |
| 4,573,483 A * | 3/1986 | Raineri | A01D 75/282 460/8 |
| 4,712,568 A * | 12/1987 | Strong | A01F 12/448 209/394 |
| 4,875,889 A * | 10/1989 | Hagerer | A01D 75/282 460/1 |
| 4,897,071 A | 1/1990 | Desnijder et al. | |

(Continued)

FOREIGN PATENT DOCUMENTS

| | | | |
|---|---|---|---|
| EP | 0212183 A1 * | 3/1987 | ........ A01D 75/282 |
| FR | 2 328 391 | 5/1977 | |

(Continued)

*Primary Examiner* — Arpad Fabian-Kovacs
(74) *Attorney, Agent, or Firm* — Peter K. Zacharias

(57) ABSTRACT

A sieve system of an agricultural vehicle for separating crop residue from grain, the sieve system including a frame, a plurality of sieve sections, a plurality of dividers and a pivoting system. The sieve sections are pivotally coupled to the frame. The sieve sections include a first sieve section. The dividers include a first divider coupled to the first sieve section. The pivoting system is coupled to the first sieve section and the first divider, to thereby pivot the sieve section at a first angle about a first axis. The pivoting system also either pivots the divider at a second angle about a second axis or flexes the divider at the second angle. The first angle is relative to the frame, and the second angle is relative to the sieve section.

20 Claims, 4 Drawing Sheets

(56) References Cited

U.S. PATENT DOCUMENTS

| | | | |
|---|---|---|---|
| 4,921,469 A * | 5/1990 | Scharf | A01D 41/1243 |
| | | | 460/10 |
| 5,085,616 A * | 2/1992 | Matousek | A01F 12/44 |
| | | | 209/394 |
| 5,205,786 A | 4/1993 | Murphy | |
| 5,282,771 A * | 2/1994 | Underwood | A01D 75/282 |
| | | | 460/8 |
| 5,338,257 A | 8/1994 | Underwood | |
| 6,843,719 B1 * | 1/2005 | Sacquitne | A01D 75/282 |
| | | | 460/101 |
| 7,306,513 B2 | 12/2007 | Mackin et al. | |
| 7,946,908 B2 | 5/2011 | Lobdell et al. | |
| 8,622,792 B1 * | 1/2014 | Murray | A01F 12/448 |
| | | | 460/101 |
| 2002/0128054 A1 * | 9/2002 | Lauer | A01D 41/1276 |
| | | | 460/101 |
| 2007/0123326 A1 * | 5/2007 | MacKin | A01D 75/282 |
| | | | 460/101 |
| 2010/0009732 A1 * | 1/2010 | Lobdell | A01D 75/282 |
| | | | 460/101 |

FOREIGN PATENT DOCUMENTS

| | | | | |
|---|---|---|---|---|
| GB | 2247850 A * | 3/1992 | | B07B 1/12 |
| JP | 06022634 A * | 2/1994 | | A01F 12/32 |
| WO | WO-9415450 A1 * | 7/1994 | | A01D 75/282 |

* cited by examiner

SIEVE ARRANGEMENT IN A CLEANING SYSTEM FOR A COMBINE HARVESTER

FIELD OF THE INVENTION

The present invention relates to agricultural harvesters, such as combine harvesters, and, more specifically to sieve systems included in cleaning systems in such combine harvesters.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

During the process of harvesting in a combine, the desired grain is gathered and saved while crop material other than the desired grain is expelled from the combine. The crop material that contains the grain is directed to the cleaning system that has a series of sieves to separate the grain from crop residue. The grain falls through the sieve while part of the crop reside is retained by the sieve and the residue is moved across the sieve to a point of discharge. The lightweight non-crop material, referred to as chaff, is separated from the grain by the air coming from the cleaning fan across or through the sieve.

Sieves operate more efficiently if the crop material is evenly distributed across the sieves and not concentrated in a narrow area. As the combine transits a field the movement of the combine and the tilt of the ground can cause the crop material on the sieve to migrate to one location which may compromise the functioning of the sieve. To compensate for this problem many combines employ a system to level the sieves. Still further combines often have sieve sections with dividers between the sections. As the combine travels on a hill, the down hill section of a sieve section, which is leveled by a pivoting system, receives a higher volume of crop material than the uphill portion. This results in some of the grain and crop material to walk out onto the dividers.

What is needed in the art is a sieve pivoting system that reduces the propensity of the grain/crop material to be poorly distributed across the sieve sections when the combine is traversing sloped ground.

SUMMARY OF THE INVENTION

Exemplary embodiments of the present invention provide for the tilting of dividers between sieve sections of a cleaning system in a combine.

In accordance with an aspect of the present invention, there is provided a sieve system of an agricultural vehicle for separating crop residue from grain, the sieve system including a frame, a plurality of sieve sections, a plurality of dividers and a pivoting system. The sieve sections are pivotally coupled to the frame. The sieve sections include a first sieve section. The dividers include a first divider coupled to the first sieve section. The pivoting system is coupled to the first sieve section and the first divider, to thereby pivot the sieve section at a first angle about a first axis. The pivoting system also either pivots the divider at a second angle about a second axis or flexes the divider at the second angle. The first angle is relative to the frame, and the second angle is relative to the sieve section.

In accordance with another aspect of the present invention, there is provided an agricultural vehicle that includes a threshing system producing a stream of crop material, and a cleaning system receiving the stream of crop material. The cleaning system including a sieve system for separating grain from the crop material, the sieve system having a frame, a plurality of sieve sections, a plurality of dividers and a pivoting system. The sieve sections are pivotally coupled to the frame. The sieve sections include a first sieve section. The dividers include a first divider coupled to the first sieve section. The pivoting system is coupled to the first sieve section and the first divider, to thereby pivot the sieve section at a first angle about a first axis. The pivoting system also either pivots the divider at a second angle about a second axis or flexes the divider at the second angle. The first angle is relative to the frame, and the second angle is relative to the sieve section.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw", "chaff" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG (Material Other than Grain).

The word "straw" refers to the stalk of the crop and it may be chopped before distribution on the field. The word "chaff" refers to the material that is removed during the sieve or sifting process and is generally smaller and lighter than the straw. Incompletely threshed crop material is referred to as "tailings". Also the terms "fore", "aft", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
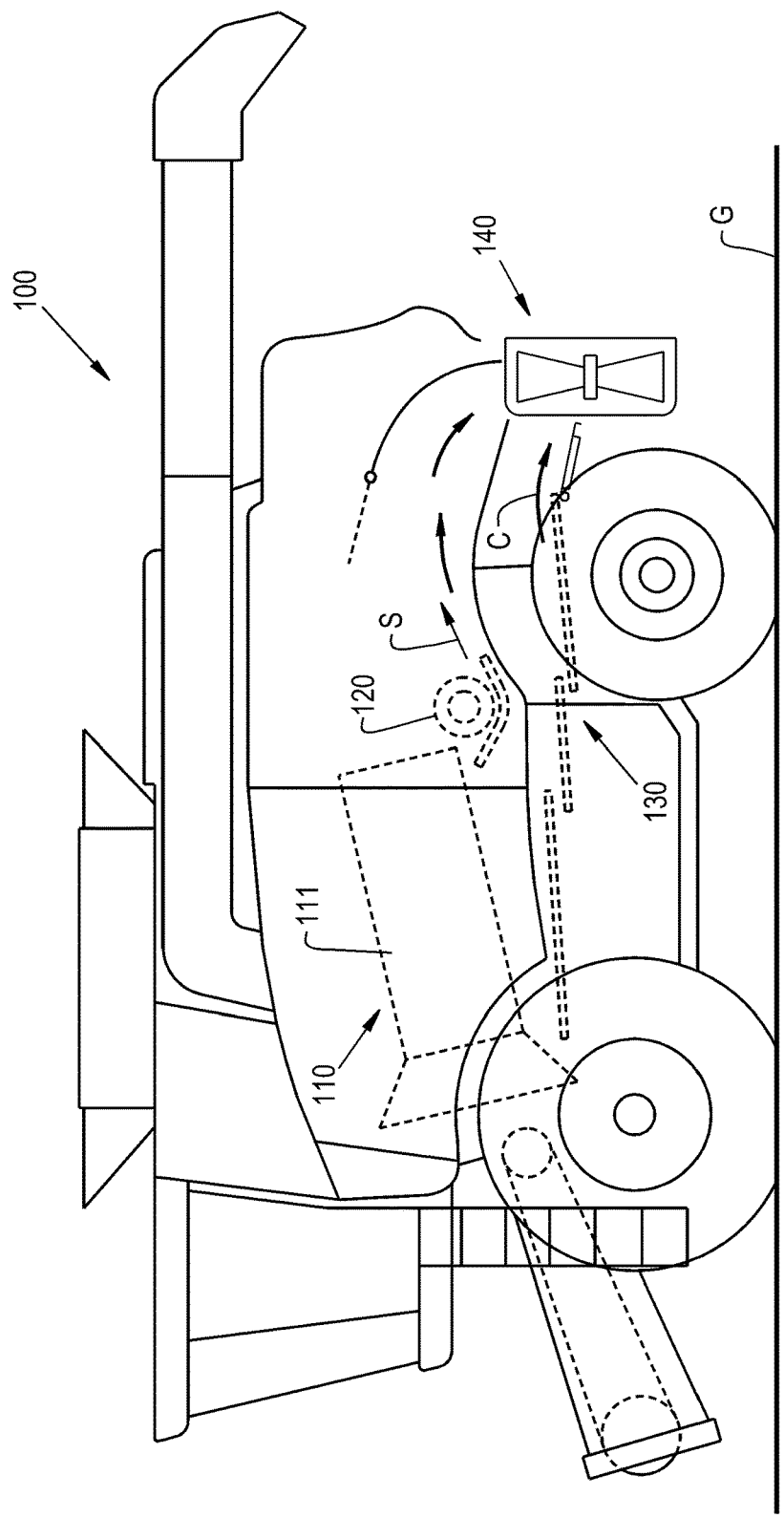
FIG. 1 is a partially sectioned side view of an exemplary embodiment of a harvesting machine with an exemplary embodiment of a cleaning system of the present invention, the cleaning system including a sieve system with a pivoting mechanism to pivot the sieve sections and the dividers therebetween.

Referring now to the drawings, and more particularly to FIG. 1, there is shown an exemplary embodiment of an agricultural vehicle 100 in the form of a combine 100 which is representative of a wide variety of agricultural harvesting machines and which generally includes a threshing system 110 having a rotor 111 rotatable in a known manner for separating the desirable crop component or grain from straw, stalks and other plant residue. A beater 120 is rotatable for propelling or directing a flow or stream of the plant residue, generally referred to as straw S, toward the rear of combine 100. A cleaning system 130 receives the threshed crop component from threshing system 110 and removes chaff and other remaining residue such as seedpods, husks and the like, generally referred to as chaff C. Flows or streams of chaff C and straw S are directed toward a spreader assembly 140 at the aft end of combine 100. Spreader assembly 140 receives the crop residue and distributes it across a portion of the ground G.

Figure 2:
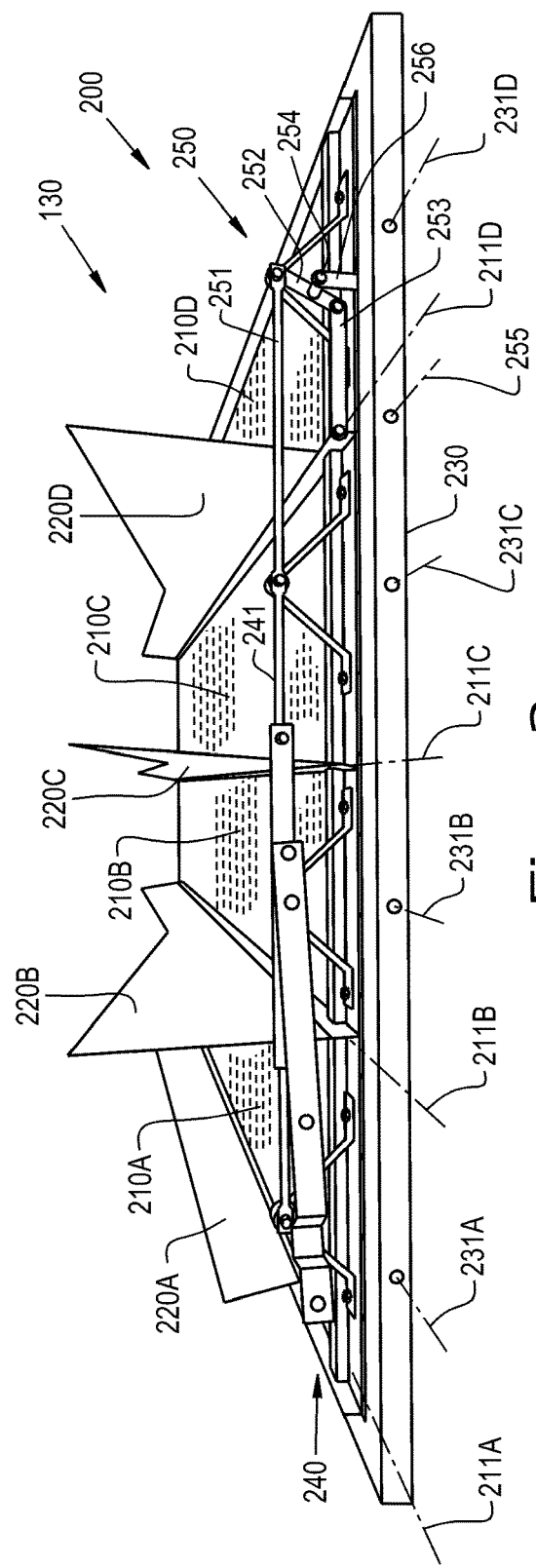
FIG. 2 is a perspective view of the sieve system introduced in FIG. 1, in accordance with an exemplary embodiment of the present invention.
Figure 3:
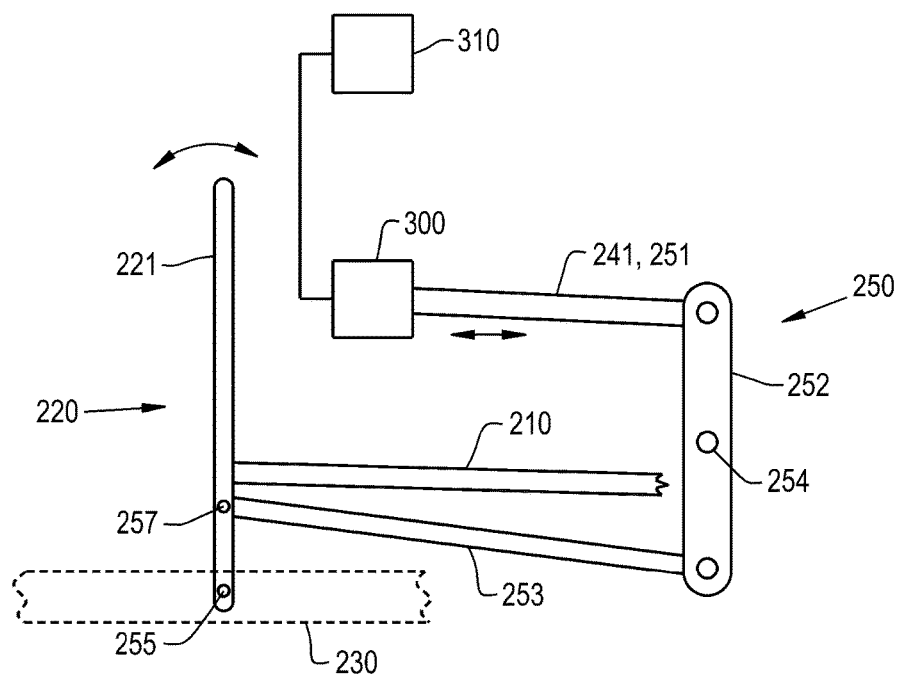
FIG. 3 is a schematized view of the pivoting mechanism of the sieve system of FIG. 1, in accordance with an exemplary embodiment of the present invention.
Figure 4:
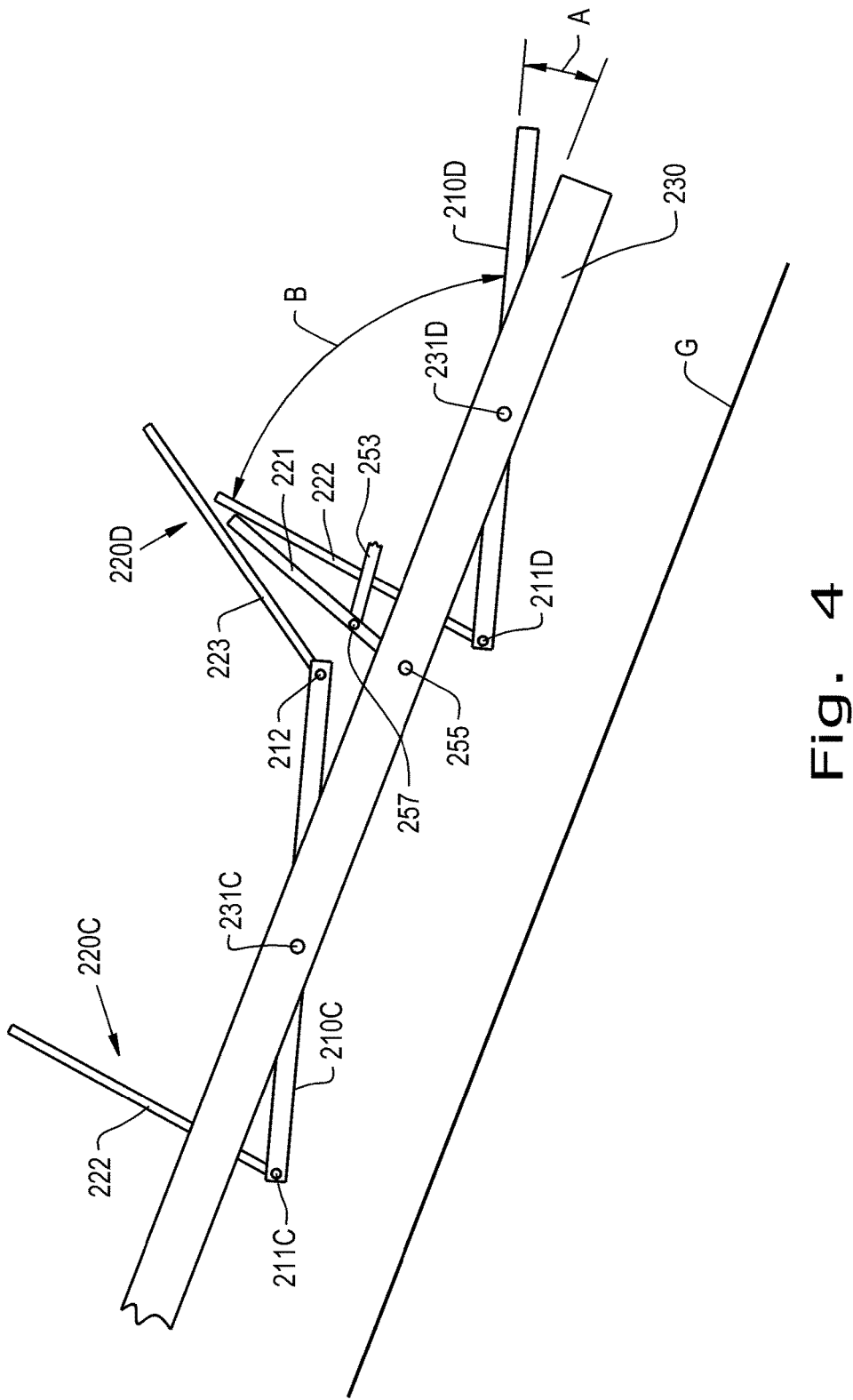
FIG. 4 is a schematized view of sieve sections, of the sieve system of FIG. 1 illustrating two sieve sections and dividers associated with each, in accordance with another exemplary embodiment of the present invention.

Cleaning system 130 includes a sieve system 200, shown in a perspective view in FIG. 2, and portions of which are illustrated in FIGS. 3 and 4, which is used for the separation of grain from threshed crop material. Sieve system 200 includes a plurality of sieve sections 210A-D, a plurality of dividers 220A-D, a frame 230, and a tilting system 240. Although FIG. 2 illustrates four sieve sections 210A-D and four dividers 220A-D it is to be understood that the sieve sections 210A-D and dividers 220A-D are not limited to four and that other numbers thereof greater than four or less than four are contemplated.

The frame 230 is a generally rectangular structure sized to pivotally support the sieve sections 210A-D and dividers 220A-D. Each sieve section 210A-D is pivotally coupled to frame 230 about a first pivot axis 231A-D at a first end of each sieve section 210A-D and a second pivot along the respective axis (not illustrated) at a second, opposite end of each sieve section 210A-D. The pivots about pivot axes 231A-D of each sieve section 210A-D allows the sieve section 210A-D to pivot thereabout with there being a pivot axis 211A-D of each sieve section 210A-D extending along a length thereof about which at least a portion of dividers 220A-D pivot about. As can be seen in the figures pivot axis 211A-D and pivot axis 231A-D are generally parallel to each other. As combine 100 travels on sloped ground G frame 230 tilts with combine 100 and sieve sections 210A-D tilt relative to frame 230 to be approximately level, having tilted about the pivot axes 231A-D in a direction that compensates for the tilt of combine 100.

Tilting system 240 moves linkages 241 that are coupled to each sieve section 210A-D to accomplish the tilting of those sieve sections 210A-D that compensates for the tilt of combine 100. Tilting system 240 is coupled to a pivoting system 250 that can be coupled to dividers 220A-D. It is illustrated in the figures that only divider 220D is driven by pivoting system 250, this is done for the sake of clarity and it is contemplated that dividers 220A-C may also be pivotally driven in the same way as divider 220D is illustrated herein. A set of linkages (not shown) may be provided to drive each divider 220A-C as divider 220D is driven and discussed herein.

The tilting of sieve sections 210A-D and dividers 220A-D is accomplished by an actuator 300 under the control of a controller 310. Actuator 300 may be a hydraulic cylinder, an electric actuator or motor, or other motion causing device. Controller 310 can be a microprocessor, an analog control system or a digital control system, which detects the tilt of combine 100 as it moves on ground G and compensates therefor by the pivoting or tilting of sieve sections 210A-D. The present invention in an exemplary manner additionally tilts dividers 220A-D relative to sieve sections 210A-D using pivoting system 250.

Divider 220D has an inner pivoting member 221 and outer members 222 and 223. Outer member 222 is either flexibly coupled to, or pivotally coupled to sieve section 210D about an axis 211D. In a like manner outer member 223 is flexibly coupled to, or pivotally coupled to sieve section 210C about an axis 212. Pivoting member 221 is coupled to, and causes outer members 222 and 223 to move by pivoting or flexing. It is also contemplated that members 222 and 223 could be an integral fabric that slides over a distal end of pivoting member 221. Outer members 222 and 223 meet along their distal ends and serve to separate or divide the threshed material falling down towards sieve sections 210C and 210D, so that the material is directed to, and maintained on, a particular sieve section 210. The meeting of the distal ends of outer members 222 and 223 can be such that they are biased toward each other (toward pivoting member 221), or that a sliding coupling arrangement is maintained therebetween.

Pivoting system 250 includes linkages 251, 252 and 253. Linkage 251 is coupled to actuator 300 and to linkage 252, while linkage 253 is coupled to linkage 252 and pivoting member 221. Linkage 252 pivots about pivot axis 254, which may be fixed to frame 230 by way of support 256. Pivoting member 221 pivots about pivot axis 255 and is tilted by linkage 253 about pivot point 257. It is also contemplated that axis 255 and axis 211D may be coaxial or be coupled to the same shaft. Looking at FIG. 3, if actuator 300 is directed by controller 310 to extend to the right, this results in a leftward movement of linkage 253 causing pivoting member 221 to pivot in a counterclockwise direction.

As can be seen in FIG. 4 when ground G is sloped, sieve sections 210C and 210D are maintained in a substantially level orientation to keep the threshed material thereon relatively evenly distributed. As shown here sieve sections 210C and 210D are angled at angle A relative to frame 230, with frame 30 being relatively parallel to ground G due to the orientation of combine 100 on ground G. As sieve sections 210C and 210D are pivoted in a counterclockwise direction about axes 231C and 231D, divider 220D is pivoted or flexed about axes 211, 212 by the pivoting of pivoting member 221 about axis 255. Whereas sieve section 210D is pivoted A degrees, dividers 220 are pivoted approximately 90 degrees minus B degrees, since dividers 220 are vertical when sieves 210C and 210D and frame 230 is horizontal. As a result of the operation of pivoting system 250, when sieve sections 210A-D are at angle A relative to frame 230, then divider 220D is at (A+B) degrees relative to frame 230.

As combine 100 tilts clockwise A degrees, sieve sections 210A-D tilt counterclockwise A degrees and dividers 220A-D tilt clockwise approximately (90–B) degrees relative to sieve section 210A-D. When the ground tilts in the opposite direction then a contra tilt of sieve sections 210A-D and dividers 220A-D takes place. This directs threshed crop material, which is falling from above, to land on the outer member 222 or 223 that is facing up, thereby causing the grain to be distributed onto the sieve section 210C or 210D that adjoins the member 222 or 223 that faces up.

As the self-leveling section sieves of the prior art systems adjust for the slope of ground G, the dividers between the sieve sections remain at a fixed angle relative to the sieve section. This does not allow for an even distribution on the sieve. The downhill section of the leveled section receives a higher volume than the uphill portion. This allows material/grain to walk out on the dividers.

As shown in FIG. 3 the linkages 251-253, the divider 220 and sieve section 210 are basically in a level ground mode, with divider 220 being at a substantially right angle to sieve section 210. FIG. 4 shows sieve sections 210C and 210D level and divider 220D tilted clockwise while frame 230 and combine 100 are sloped due to the terrain of ground G.

In testing, completed for the inventor, on hills with the prior art self-leveling sieve sections, it is seen that the downhill side of the sieve section receives considerably more grain than the uphill portion. This is true even when an offset angle of the sieves is used to compensate. This grain then moves rearward on the divider and thus does not allow grain to fall into the clean grain delivery. As grain is delivered to the sieve, there is some drift to the downhill side of the machine. When on the hillside the self-leveling sieve sections adjust so that the sieve sections are level to or in most cases slightly offset to slope opposite the downhill side. As grain comes to the sieves there is a considerable depth to the material mat. As has been seen in testing, there is significantly more grain on the downhill side. This then allows the grain to move rearward on the sieve dividers, which are at the same slope as the tilt of the ground that the machine is running on.

However, with the advantages of the exemplary aspects of the present invention, the dividers 220A-D will move opposite of the self-leveling sieve sections 210A-D. As can be understood, this will not create a divider 220 that allows for the grain to ride on the sieve divider 220. Also another aspect of the self-adjusting dividers 220A-D is that grain falling onto the sieve sections 210A-D and dividers 220A-D will be placing the grain from an area where it would have fallen onto a downhill side of another section 210, thus putting more grain on the uphill side of the sieve sections 210A-D, hence a more even distribution of the threshed material on the sieve sections 210A-D is accomplished.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sieve system of an agricultural vehicle for separating crop residue from grain, comprising:
    a frame;
    a plurality of sieve sections pivotally coupled to the frame, the plurality of sieve sections including a first sieve section;
    a plurality of dividers including a first divider coupled to the first sieve section; and
    a pivoting system coupled to the first sieve section and the first divider, the pivoting system pivoting the sieve section at a first angle about a first axis, the pivoting system either pivoting the divider at a second angle about a second axis or flexing the divider at the second angle, the first angle being relative to the frame, the second angle being relative to the sieve section, the pivoting of the first sieve section at the first angle and the pivoting or flexing of the divider at the second angle are movements that are opposite each other, the first axis and the second axis being generally parallel to each other.

2. The sieve system of claim 1, wherein as the first angle becomes greater in a clockwise direction the second angle diminishes in a clockwise direction.

3. The sieve system of claim 1, wherein as the first angle diminishes in a clockwise direction the second angle increases in a clockwise direction.

4. The sieve system of claim 3, wherein the second axis is at a distal end of the first sieve section relative to the first axis.

5. The sieve system of claim 4, wherein the first axis is proximate to a middle of the first sieve section.

6. The sieve system of claim 1, wherein the plurality of sieve sections includes a second sieve section, the first divider additionally being coupled to the second sieve section.

7. The sieve system of claim 6, wherein the plurality of dividers further includes a second divider coupled to the second sieve, the second divider being coupled to a side opposite a side that the first divider is coupled to.

8. The sieve system of claim 7, wherein the pivoting system is coupled to the second sieve section and the second divider like the pivoting system is coupled to the first sieve section and the first divider.

9. The sieve system of claim 1, wherein the pivoting system flexes the first divider at the second angle.

10. The sieve system of claim 1, wherein the pivoting system includes a first link that pivots the first sieve section, and a second link that is coupled to the first link that causes the first divider to pivot or flex.

11. An agricultural vehicle for harvesting a crop, the agricultural vehicle comprising:
    a threshing system producing a stream of crop material;
    a cleaning system receiving the stream of crop material, the cleaning system including a sieve system for separating grain from the crop material, the sieve system having:
    a frame;
    a plurality of sieve sections pivotally coupled to the frame, the plurality of sieve sections including a first sieve section;
    a plurality of dividers including a first divider coupled to the first sieve section; and
    a pivoting system coupled to the first sieve section and the first divider, the pivoting system pivoting the sieve section at a first angle about a first axis, the pivoting system either pivoting the divider at a second angle about a second axis or flexing the divider at the second angle, the first angle being relative to the frame, the second angle being relative to the sieve section, the pivoting of the first sieve section at the first angle and the pivoting or flexing of the divider at the second angle are movements that are opposite each other.

12. The agricultural vehicle of claim 11, wherein as the first angle becomes greater in a clockwise direction the second angle diminishes in a clockwise direction.

13. The agricultural vehicle of claim 11, wherein as the first angle diminishes in a clockwise direction the second angle becomes greater in a clockwise direction.

14. The agricultural vehicle of claim 13, wherein the second axis is at a distal end of the first sieve section relative to the first axis.

15. The agricultural vehicle of claim 14, wherein the first axis is proximate to a middle of the first sieve section.

16. The agricultural vehicle of claim 11, wherein the plurality of sieve sections includes a second sieve section, the first divider additionally being coupled to the second sieve section.

17. The agricultural vehicle of claim 16, wherein the plurality of dividers further includes a second divider coupled to the second sieve, the second divider being coupled to a side opposite a side that the first divider is coupled to.

18. The agricultural vehicle of claim 17, wherein the pivoting system is coupled to the second sieve section and the second divider like the pivoting system is coupled to the first sieve section and the first divider.

19. The agricultural vehicle of claim 11, wherein the pivoting system flexes the first divider at the second angle.

20. The agricultural vehicle of claim 11, wherein the pivoting system includes a first link that pivots the first sieve section, and a second link that is coupled to the first link that causes the first divider to pivot or flex.

* * * * *